US012106367B2

(12) United States Patent
Ayikara Kizhakayil et al.

(10) Patent No.: US 12,106,367 B2
(45) Date of Patent: *Oct. 1, 2024

(54) INTEGRATION APPLICATION UTILIZING A COMMUNICATIONS PROTOCOL

(71) Applicant: Chicago Mercantile Exchange Inc., Chicago, IL (US)

(72) Inventors: Mohandas Ayikara Kizhakayil, Naperville, IL (US); Graham Robert McDannel, Chicago, IL (US); Lakshmi Sameera Peyyalamitta, Chicago, IL (US); Hersh Mukesh Chaudhari, Schaumburg, IL (US); Anna-Lisa Suarez Vu, Chicago, IL (US); Makenzie June Billings Quinn, Bartlett, IL (US); Robert Jason Timberlake, Chicago, IL (US)

(73) Assignee: Chicago Mercantile Exchange Inc., Chicago, IL (US)

( * ) Notice: Subject to any disclaimer, the term of this patent is extended or adjusted under 35 U.S.C. 154(b) by 272 days.

This patent is subject to a terminal disclaimer.

(21) Appl. No.: 17/571,813

(22) Filed: Jan. 10, 2022

(65) Prior Publication Data

US 2022/0129986 A1    Apr. 28, 2022

Related U.S. Application Data

(63) Continuation of application No. 17/141,345, filed on Jan. 5, 2021, now Pat. No. 11,257,160, which is a (Continued)

(51) Int. Cl.
*G06Q 40/04* (2012.01)
*G06Q 30/0601* (2023.01)
(Continued)

(52) U.S. Cl.
CPC ......... *G06Q 40/04* (2013.01); *G06Q 30/0601* (2013.01); *H04L 47/2475* (2013.01);
(Continued)

(58) Field of Classification Search
None
See application file for complete search history.

(56) References Cited

U.S. PATENT DOCUMENTS 5,748,617 A * 5/1998 McLain, Jr. ........ H04M 3/2254
703/23
5,809,286 A * 9/1998 McLain, Jr. ........ H04M 3/2254
703/23

(Continued)

OTHER PUBLICATIONS

M. Takesue, "E-mail Sender Identification through Trusted Local Deposit-Agents," 2011 14th International Conference on Network-Based Information Systems, 2011, pp. 84-91, doi: 10.1109/NBiS.2011.22 (Deposit) (Year: 2011).*

(Continued)

*Primary Examiner* — Chikaodinaka Ojiaku
(74) *Attorney, Agent, or Firm* — Lempia Summerfield Katz LLC

(57) ABSTRACT

A computer system configured to facilitate communications over a plurality of communication platforms includes a chat monitor configured to monitor communications over a plurality of communication platforms; a parser coupled to the chat monitor and configured to detect whether a communication entered into a communication client corresponds to a communication protocol, the communication protocol including a protocol identifier and a plurality of primary protocol elements including a first user identifier and an instrument identifier; a protocol validator coupled to the parser and configured to validate communications corresponding to the communication protocol; and a database coupled to the protocol validator for storing validated com- (Continued)

munications. Each communication platform may be associated with a plurality of communication clients, and each communication platform may be configured to transmit communications between communication clients associated with the communication platform.

20 Claims, 6 Drawing Sheets

Related U.S. Application Data continuation of application No. 15/854,365, filed on Dec. 26, 2017, now Pat. No. 10,915,954.

(51) Int. Cl.
  H04L 47/2475 (2022.01)
  H04L 51/046 (2022.01)
  H04L 51/18 (2022.01)
  G06Q 10/107 (2023.01)
  G06Q 40/02 (2023.01)

(52) U.S. Cl.
  CPC ............ H04L 51/046 (2013.01); H04L 51/18 (2013.01); G06Q 10/107 (2013.01); G06Q 40/02 (2013.01)

(56) References Cited

U.S. PATENT DOCUMENTS

| | | | | |
|---|---|---|---|---|
| 5,867,689 A * | 2/1999 | McLain, Jr. | ........ | H04M 3/2254 703/23 |
| 5,896,382 A * | 4/1999 | Davis | ................. | H04Q 11/0478 370/347 |
| 5,946,647 A | 8/1999 | Miller et al. | | |
| 6,035,878 A * | 3/2000 | Adams | ............... | G05D 16/2095 137/12 |
| 6,056,008 A * | 5/2000 | Adams | ............... | G05D 16/2095 137/492.5 |
| 6,427,088 B1 * | 7/2002 | Bowman, IV | .... | A61M 5/14276 607/60 |
| 6,686,838 B1 * | 2/2004 | Rezvani | ................ | H04W 60/04 709/224 |
| 7,039,610 B2 | 5/2006 | Morano et al. | | |
| 7,177,833 B1 | 2/2007 | Marynowski | | |
| 7,672,892 B2 | 3/2010 | Odom | | |
| 7,769,667 B2 | 8/2010 | Glinberg et al. | | |
| 7,831,491 B2 | 11/2010 | Newell et al. | | |
| 7,853,499 B2 | 12/2010 | Czupek et al. | | |
| 7,925,702 B2 | 4/2011 | Rood et al. | | |
| 7,933,830 B1 * | 4/2011 | Buck | ....................... | G06Q 40/04 705/37 |
| 8,065,373 B2 | 11/2011 | Bryan et al. | | |
| 8,078,485 B1 * | 12/2011 | Kraehmueller | ...... | G06Q 10/063 705/7.29 |
| 8,175,955 B2 * | 5/2012 | Friesen | .................. | G06Q 40/00 705/37 |
| 8,176,127 B2 | 5/2012 | Keen, Jr. et al. | | |
| 8,401,952 B1 * | 3/2013 | Foygel | ................... | G06Q 40/04 705/37 |
| 8,527,390 B1 * | 9/2013 | Mintz | .................... | G06Q 40/04 705/37 |
| 8,793,177 B1 * | 7/2014 | Schwarz | ................ | G06Q 40/04 705/37 |
| 8,930,257 B1 * | 1/2015 | Howorka | ............... | G06Q 40/04 705/37 |
| 9,712,333 B2 | 7/2017 | Carino et al. | | |
| 10,387,952 B1 * | 8/2019 | Sandhu | .................. | G06Q 40/06 |
| 2001/0049651 A1 | 12/2001 | Selleck | | |
| 2002/0077077 A1 * | 6/2002 | Rezvani | ................ | H04W 8/005 455/410 |
| 2003/0140090 A1 * | 7/2003 | Rezvani | .............. | H04L 41/0233 709/213 |
| 2003/0140107 A1 * | 7/2003 | Rezvani | .................. | H04L 67/02 709/208 |
| 2003/0182124 A1 | 9/2003 | Khan | | |
| 2003/0182420 A1 | 9/2003 | Jones | | |
| 2005/0050140 A1 | 3/2005 | Back | | |
| 2005/0096999 A1 | 5/2005 | Newell et al. | | |
| 2005/0203826 A1 | 9/2005 | Farrell et al. | | |
| 2007/0094329 A1 | 4/2007 | Cameron | | |
| 2008/0319891 A1 | 12/2008 | Scheinberg | | |
| 2009/0006240 A1 | 1/2009 | Zhao | | |
| 2009/0193092 A1 | 7/2009 | Li | | |
| 2010/0138360 A1 | 6/2010 | Cutler et al. | | |
| 2010/0287114 A1 | 11/2010 | Bartko | | |
| 2010/0332366 A1 * | 12/2010 | de Boer | ................. | G06Q 40/04 705/37 |
| 2010/0332367 A1 | 12/2010 | Foygel | | |
| 2011/0246389 A1 | 10/2011 | Ziolek | | |
| 2012/0254008 A1 | 10/2012 | Brady | | |
| 2013/0073636 A1 | 3/2013 | Zhu | | |
| 2014/0006243 A1 | 1/2014 | Boudreault et al. | | |
| 2014/0164207 A1 | 6/2014 | Rotella | | |
| 2015/0073962 A1 | 3/2015 | Bixby et al. | | |
| 2015/0127516 A1 | 5/2015 | Studnitzer et al. | | |
| 2015/0221032 A1 | 8/2015 | Rohlfs | | |
| 2015/0356679 A1 | 12/2015 | Schmitt | | |
| 2016/0182414 A1 | 6/2016 | Mestanogullari et al. | | |
| 2016/0292672 A1 | 10/2016 | Fay et al. | | |
| 2017/0053349 A1 | 2/2017 | Peck-Walden et al. | | |
| 2017/0061539 A1 | 3/2017 | Cunningham | | |

OTHER PUBLICATIONS

T. Bujlow, V. Carela-Español, J. Sole-Pareta and P. Barlet-Ros, "A Survey on Web Tracking: Mechanisms, Implications, and Defenses," in Proceedings of the IEEE, vol. 105, No. 8, pp. 1476-1510, Aug. 2017, (Survey). (Year: 2017).*

Averina et al., "Special Features of Testing Tools Applicable for Use in Trading Systems Production", 2013 Tools & Methods of Program Analysis, 2013, pp. 39-43.

Bonnie A. Nardi et al., "Collaborative, Programmable Intelligent Agents", Miramontes Interactive, Innovative Information Management: Apple Data Detectors, Mar. 1998, http://www.miramontes.com/writing/add-cacm/index.php.

Daniel Eran Dilger, "How Samsung & Google Teamed up to Steal Apple Data Detectors for Android", appleinsider.com, Apr. 10, 2014, http://appleinsider.com/articles/14/04/10/how-samsung-google-teamed-up-to-steal-apple-data-detectors-for-android.

European Search Report from, EP Application No. 18210877, Mar. 18, 2019, EP.

Francesco Schiavon, "5 Super Useful Tips for Mac OS X Mail: What are Data Detectors Anyway?", macPro Video.com, Jun. 14, 2014, https://www.macprovideo.com/hub/mac-osx/5-super-useful-tips-for-mac-os-x-mail-what-are-data-detectors-anyway.

Masaru Takesue, "E-mail Sender Identification through Trusted Local Deposit-Agents", 2011 International Conference on Network-Based Information Systems, 2011, pp. 84-91.

* cited by examiner

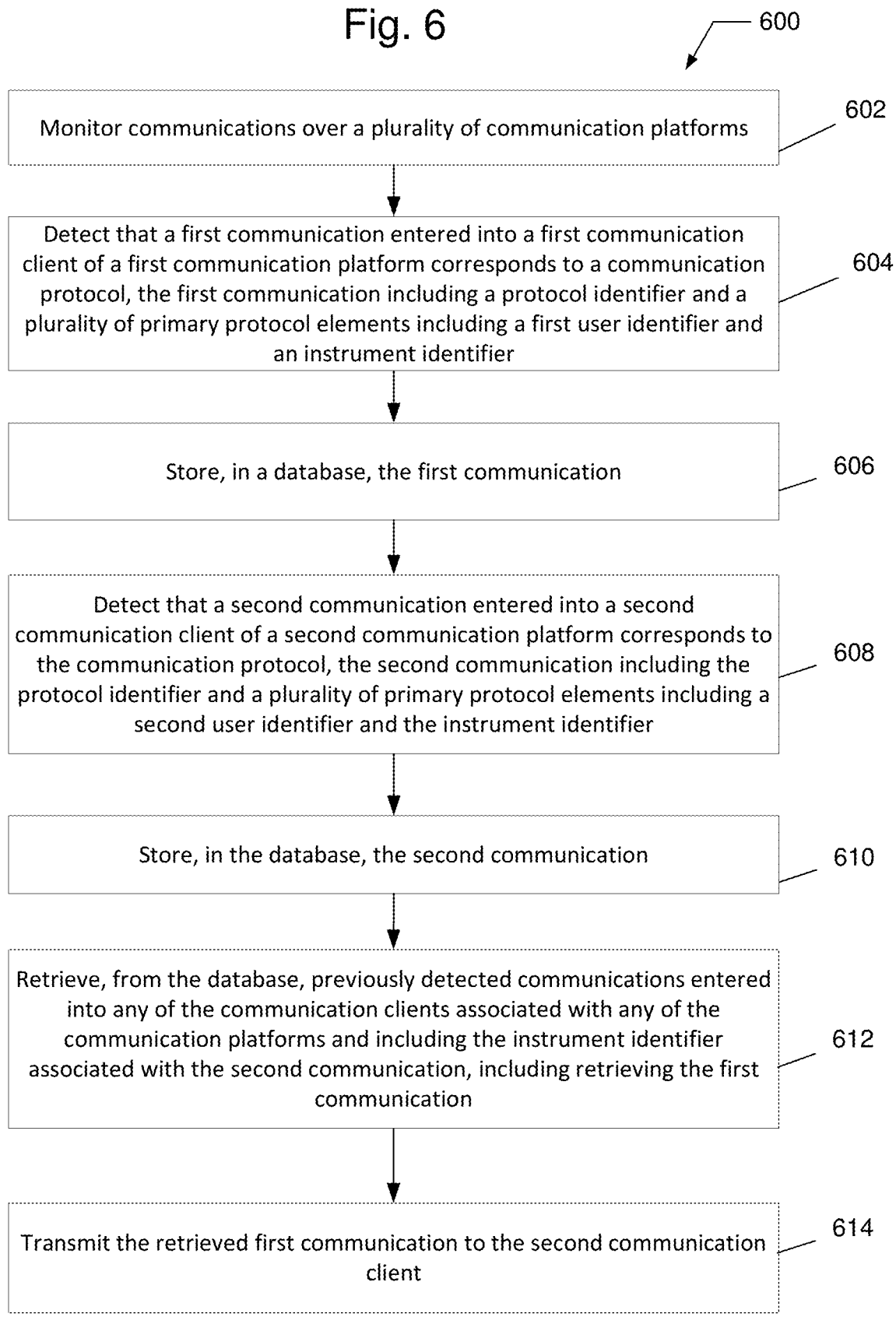

INTEGRATION APPLICATION UTILIZING A COMMUNICATIONS PROTOCOL

REFERENCE TO RELATED APPLICATIONS

This application claims priority to and the benefit as a continuation of U.S. patent application Ser. No. 17/141,345, filed Jan. 5, 2021, entitled, "INTEGRATION APPLICATION UTILIZING A COMMUNICATIONS PROTOCOL", now U.S. Pat. No. 11,257,160, issued Feb. 22, 2022, which claims priority to and the benefit as a continuation of U.S. patent application Ser. No. 15/854,365, filed Dec. 26, 2017, entitled, "INTEGRATION APPLICATION UTILIZING A COMMUNICATIONS PROTOCOL", now U.S. Pat. No. 10,915,954, issued Feb. 9, 2021, the entirety of which are incorporated by reference herein and relied upon.

FIELD OF INVENTION

The present application relates to communications protocols and more specifically to software and associated systems and methods for an integration application utilizing a communications protocol over multiple communication platforms.

BACKGROUND

An electronic exchange computing system, such as a futures exchange, such as the Chicago Mercantile Exchange Inc. (CME), provides a contract market where financial instruments, e.g., futures and options on futures, are traded using electronic systems. Electronic trading of financial instruments, such as futures contracts, is conducted by market participants sending orders, such as to buy or sell one or more futures contracts, in electronic form to the exchange. These electronically submitted orders to buy and sell are then matched, if possible, by the exchange, i.e., by the exchange's matching engine, to execute a trade. Outstanding (unmatched, wholly unsatisfied/unfilled or partially satisfied/filled) orders are maintained in one or more data structures or databases referred to as "order books," such orders being referred to as "resting," and made visible, i.e., their availability for trading is advertised, to the market participants through electronic notifications/broadcasts, referred to as market data feeds. An order book is typically maintained for each product, e.g., instrument, traded on the electronic trading system and generally defines or otherwise represents the state of the market for that product, i.e., the current prices at which the market participants are willing buy or sell that product. As such, as used herein, an order book for a product may also be referred to as a market for that product.

An order book, which is also known as a central limit order book ("CLOB") that consolidates orders in a central location, is used to match customer orders. Upon receipt of an incoming order to trade in a particular financial instrument, whether for a single-component financial instrument, e.g., a single futures contract, or for a multiple-component financial instrument, e.g., a combination contract such as a spread contract, a match engine, as described herein, will attempt to identify a previously received but unsatisfied order counter thereto, i.e., for the opposite transaction (buy or sell) in the same financial instrument at the same or better price (but not necessarily for the same quantity unless, for example, either order specifies a condition that it must be entirely filled or not at all).

Previously received but unsatisfied orders, i.e., orders which either did not match with a counter order when they were received or their quantity was only partially satisfied, referred to as a partial fill, are maintained by the electronic trading system in an order book database/data structure to await the subsequent arrival of matching orders or the occurrence of other conditions which may cause the order to be modified or otherwise removed from the order book.

If the match engine identifies one or more suitable previously received but unsatisfied counter orders, they, and the incoming order, are matched to execute a trade there between to at least partially satisfy the quantities of one or both the incoming order or the identified orders. If there remains any residual unsatisfied quantity of the identified one or more orders, those orders are left on the order book with their remaining quantity to await a subsequent suitable counter order, i.e., to rest. If the match engine does not identify a suitable previously received but unsatisfied counter order, or the one or more identified suitable previously received but unsatisfied counter orders are for a lesser quantity than the incoming order, the incoming order is placed on the order book, referred to as "resting", with original or remaining unsatisfied quantity, to await a subsequently received suitable order counter thereto. The match engine then generates match event data reflecting the result of this matching process. Other components of the electronic trading system then generate the respective order acknowledgment and market data messages and transmit those messages to the market participants.

Unlike the CLOB method, traders in over-the-counter ("OTC") markets engage in bilateral transactions of standardized and unstandardized derivative contracts, i.e., traders communicate with each other and are free to choose counterparties. Bilateral transactions are negotiated through a number of disparate communication platforms including brokers, telephone orders and transactions generated from social media and/or electronic chat. When traders use different communication platforms for bilateral transactions, the potential liquidity from all the different bids and offers proposed by traders is not pooled together. Discovery of appropriate counteroffers is difficult. The disclosed embodiments provide for improved discovery and processing of bilateral transactions over multiple incompatible communication platforms.

BRIEF DESCRIPTION OF THE DRAWINGS

FIG. 6 depicts a high-level flowchart illustrating a method for implementing an integration application, according to some embodiments.

DETAILED DESCRIPTION

Figure 1:
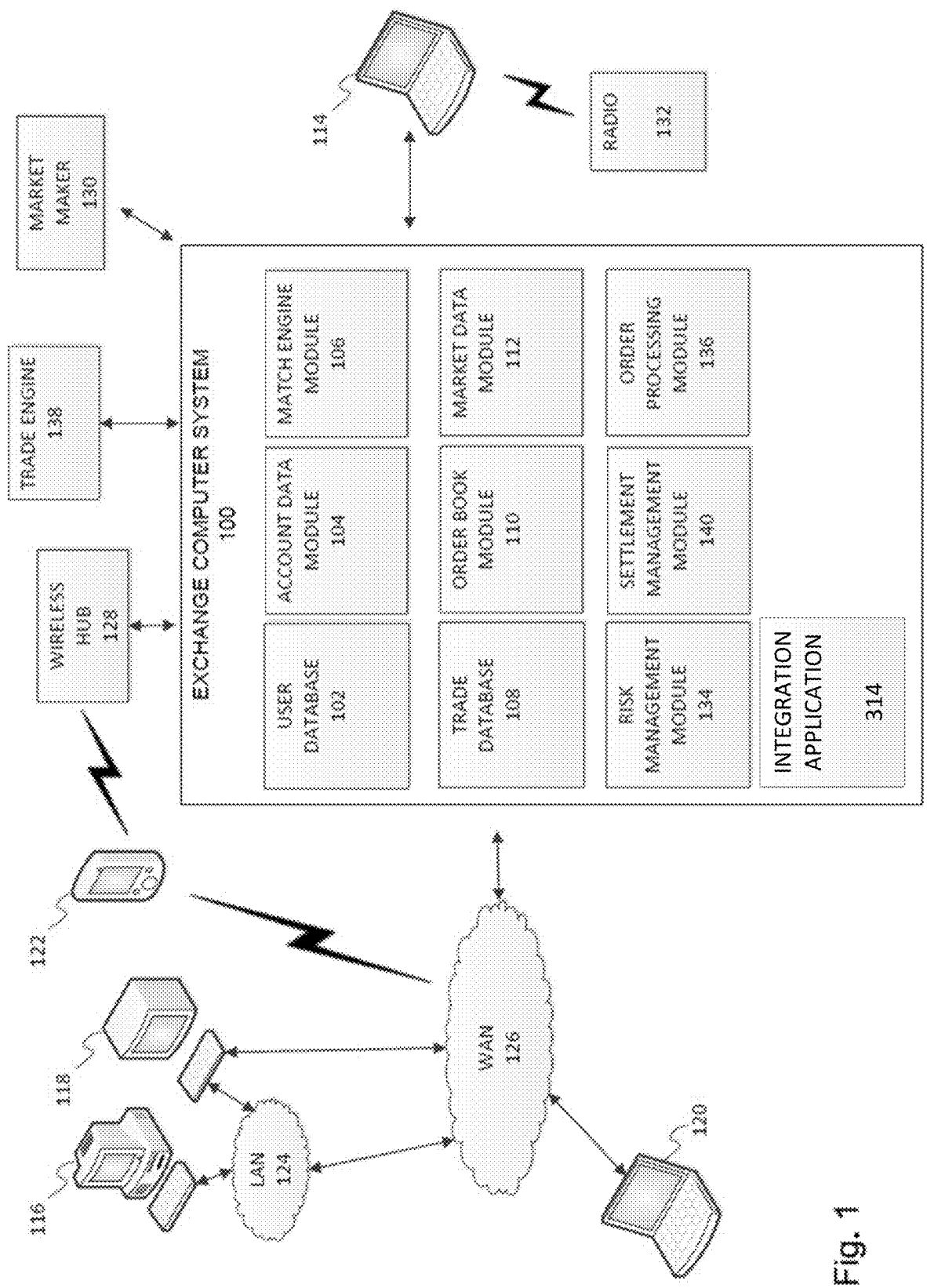
FIG. 1 depicts a computer network system, according to some embodiments.

The disclosed systems and methods relate generally to integrating communications over disparate communication platforms using a protocol that standardizes communications over the disparate communication platforms. An integration application on each trader's computing device monitors communications across various communication platforms. Each communication platform is associated with a plurality of communication clients, where communication clients across the same communication platform can send messages to each other. Upon detecting the use of the communication protocol in a communication client of a specific communication platform, the integration application transmits information entered by the trader into the communication client to a centralized database. The integration application also queries the database for entries related to the communication protocol entered by the trader, and presents, via the communication platform, information related to the entries to the trader's display. The communication protocol may begin with a protocol identifier that signals the use of the communication protocol, and may also include protocol elements related to the trader's communications. The communication protocol is independent of the communication platform, and is standardized across all of the disparate communication platforms. The communication protocol may also include protocol elements that signify agreement between parties to perform a transaction. Upon use of the agreement protocol elements, the negotiated communications are committed and automatically transmitted to a clearing house.

Traders in bilateral transactions communicate using different communication platforms, including networked social media applications, or instant messaging or chat messaging (sometimes referred to as IM or "IMing"). Commercial messenger applications exist and are used frequency such as WhatsApp, Facebook messenger, AIM and WeChat, among others. Traders in bilateral transactions may also communicate using networked social media applications, such a Twitter, or positing a message on a Facebook "wall", Reddit, and/or other online forums. Proprietary applications exist as well and may be supported and maintained by an exchange or other entity. Such applications run on a number of different platforms including personal computers (PCs), mobile phones, PDAs or other environments. Chat differs from ordinary e-mail in that there is immediacy in the message exchange. Chat makes a continued exchange of messages simpler than sending e-mail back and forth. Chat communications may be text-only or include images or moving pictures. Chat may be used to communicate instructions to a trader who in turn performs securities trading functions on behalf of clients. It is beneficial to use chat functions for communicating time-sensitive information as chat is near instantaneous. For more information on the use of messaging in a financial context, see U.S. Patent Publication No. 2016/0182414 filed Dec. 22, 2014 entitled "Electronic Messaging Management", U.S. patent application Ser. No. 15/282,302 filed Sep. 30, 2016 entitled "Context Based Messaging", and U.S. patent application Ser. No. 15/788,399 filed Oct. 19, 2017 entitled "Message Encoding And Transmission Across Multiple Platforms", all of which are assigned to the assignee of the present application, the entire disclosures of each of which is incorporated by reference herein and relied upon.

A user/trader must typically create a profile and register with a communication platform in order to participate in chat conversations with other registered users of that communication platform. A trader's computer that participates in a chat conversation over a communication platform is a communication client of that communication platform. Communication platforms are configured to enable chat sessions or communications between users of that communication platform. If users A and B are both registered users of communication platform 1, users A and B can communicate with each other by installing communication platform 1 software on their respective computers. If user C is not a registered user of communication platform 1, user C cannot communicate with users A and B using communication platform 1. Accordingly, although the ability to use multiple different communication platforms increases flexibility and convenience of communicating with a variety of different parties, the use of disparate communication platforms creates fractured markets that do not communicate with each other. Liquidity that exists over one communication platform is not visible to available to users of a different communication platform. Moreover, if a trader uses multiple different communication platforms, the trader must maintain and use different software to communicate with each communication platform and must also organize his or her trading strategies across all communication platforms.

The disclosed system may maintain a state of the market for various financial instruments regardless of the communication platform/communication client into which the bid or ask, referred to herein as a communication, was entered. The disclosed embodiments may detect the use of a communication protocol in any of the communication clients, parse the communication, and update a centralized database that maintains the market state. The disclosed embodiments may also transmit to communication clients information about relevant financial instruments.

Without the disclosed embodiments, each user would have to register, maintain and utilize separate accounts and modes of access for each communication platform, which may be cumbersome and inconvenient. Moreover, users would likely find themselves entering redundant communications into multiple communication clients. For example, a user interested in CrudeOil may decide, despite the inconvenience, to enter proposals or quotes in Facebook, Yahoo, and Twitter. Then, the user would need monitor and reconcile communications via each of those disparate communication clients. When all of the various users across the world using a variety of different communication platforms are considered, it becomes apparent that there exist numerous fractured markets that have no easy way to discover each other and form larger pools of liquidity. As is known in the art, a larger pool of liquidity for a given market increases the likelihood that orders are matched and trades are executed, increasing the satisfaction of the users/traders as well as the exchange computing system.

Communication platforms may provide some level of interoperability with each other, e.g., Facebook and Yahoo Chat may agree to transfer communications to each other. However such interoperability is complex, because it requires the two communication platforms to work closely together to allow data from one communication platform to flow, preferably seamlessly, to another communication platform. Communication platforms are often incentivized to gain users and popularity by retaining some level of exclusivity and independence from other communication platforms. Moreover, communication platforms agreeing to provide interoperability with each other is not preferable because users still need to depend on action and cooperation between communication platforms. If two communication platforms have not entered into an agreement to share users, user profile data, messages, settings and other valuable information, the users have no way to discover each other, and no way to discover pools of liquidity associated with each user.

Modern electronic communications networks, such as the Internet, facilitate the arbitrary creation of new modes of communications as well as independent/siloed methods of utilizing/accessing those modes which readily facilitates segregation/isolation of communications among users of each mode/method from users of other modes/methods. Prior modes of communication were limited, e.g. face to face, telephone, etc., forcing consolidation of users and their communications but also enabling ready access to such communications, etc. The disclosed embodiments address these technical problems caused by modern communications networks.

One exemplary environment where integrating chat communications is desirable is in financial markets, and in particular, electronic financial exchanges, such as a futures exchange, such as the Chicago Mercantile Exchange Inc. (CME). In particular, an exchange may offer multiple products and contracts for purchase that may be entered into using the order tickets.

A financial instrument trading system, such as a futures exchange, such as the Chicago Mercantile Exchange Inc. (CME), provides a contract market where financial instruments, e.g., futures and options on futures, are traded using electronic systems. "Futures" is a term used to designate all contracts for the purchase or sale of financial instruments or physical commodities for future delivery or cash settlement on a commodity futures exchange. A futures contract is a legally binding agreement to buy or sell a commodity at a specified price at a predetermined future time. An option contract is the right, but not the obligation, to sell or buy the underlying instrument (in this case, a futures contract) at a specified price within a specified time. The commodity to be delivered in fulfillment of the contract, or alternatively the commodity for which the cash market price shall determine the final settlement price of the futures contract, is known as the contract's underlying reference or "underlier." The terms and conditions of each futures contract are standardized as to the specification of the contract's underlying reference commodity, the quality of such commodity, quantity, delivery date, and means of contract settlement. Cash settlement is a method of settling a futures contract whereby the parties effect final settlement when the contract expires by paying/receiving the loss/gain related to the contract in cash, rather than by effecting physical sale and purchase of the underlying reference commodity at a price determined by the futures contract, price. Options and futures may be based on more generalized market indicators, such as stock indices, interest rates, futures contracts and other derivatives.

An exchange may provide for a centralized "clearing house" through which trades made must be confirmed, matched, and settled each day until offset or delivered. The clearing house may be an adjunct to an exchange, and may be an operating division of an exchange, which is responsible for settling trading accounts, clearing trades, collecting and maintaining performance bond funds, regulating delivery, and reporting trading data. One of the roles of the clearing house is to mitigate credit risk. Clearing is the procedure through which the clearing house becomes buyer to each seller of a futures contract, and seller to each buyer, also referred to as a novation, and assumes responsibility for protecting buyers and sellers from financial loss due to breach of contract, by assuring performance on each contract. A clearing member is a firm qualified to clear trades through the clearing house.

The clearing house of an exchange clears, settles and guarantees matched transactions in contracts occurring through the facilities of the exchange. In addition, the clearing house establishes and monitors financial requirements for clearing members and conveys certain clearing privileges in conjunction with the relevant exchange markets.

The clearing house establishes clearing level performance bonds (margins) for all products of the exchange and establishes minimum performance bond requirements for customers of such products. A performance bond, also referred to as a margin requirement, corresponds with the funds that must be deposited by a customer with his or her broker, by a broker with a clearing member or by a clearing member with the clearing house, for the purpose of insuring the broker or clearing house against loss on open futures or options contracts. This is not a part payment on a purchase. The performance bond helps to ensure the financial integrity of brokers, clearing members and the exchange as a whole. The performance bond refers to the minimum dollar deposit required by the clearing house from clearing members in accordance with their positions. Maintenance, or maintenance margin, refers to a sum, usually smaller than the initial performance bond, which must remain on deposit in the customer's account for any position at all times. The initial margin is the total amount of margin per contract required by the broker when a futures position is opened. A drop in funds below this level requires a deposit back to the initial margin levels, i.e., a performance bond call. If a customer's equity in any futures position drops to or under the maintenance level because of adverse price action, the broker must issue a performance bond/margin call to restore the customer's equity. A performance bond call, also referred to as a margin call, is a demand for additional funds to bring the customer's account back up to the initial performance bond level whenever adverse price movements cause the account to go below the maintenance.

The exchange derives its financial stability in large part by removing debt obligations among market participants as they occur. This is accomplished by determining a settlement price at the close of the market each day for each contract and marking all open positions to that price, referred to as "mark to market." Every contract is debited or credited based on that trading session's gains or losses. As prices move for or against a position, funds flow into and out of the trading account. In the case of the CME, each business day by 6:40 a.m. Chicago time, based on the mark-to-the-market of all open positions to the previous trading day's settlement price, the clearing house pays to or collects cash from each clearing member. This cash flow, known as settlement variation, is performed by CME's settlement banks based on instructions issued by the clearing house. All payments to and collections from clearing members are made in "same-day" funds. In addition to the 6:40 a.m. settlement, a daily intra-day mark-to-the market of all open positions, including trades executed during the overnight GLOBEX®, the CME's electronic trading systems, trading session and the current day's trades matched before 11:15 a.m., is performed using current prices. The resulting cash payments are made intra-day for same day value. In times of extreme price volatility, the clearing house has the authority to perform additional intra-day mark-to-the-market calculations on open positions and to call for immediate payment of settlement variation. CME's mark-to-the-market settlement system differs from the settlement systems implemented by many other financial markets, including the interbank, Treasury securities, over-the-counter foreign exchange and debt, options, and equities markets, where participants regularly assume credit exposure to each other. In those markets, the failure of one participant can have a ripple effect on the solvency of the other participants. Conversely, CME's mark-to-the-market system does not allow losses to accumulate over time or allow a market participant the opportunity to defer losses associated with market positions.

While the disclosed embodiments may be discussed in relation to futures and/or options on futures trading, it should be appreciated that the disclosed embodiments may be applicable to any equity, fixed income security, currency, commodity, options or futures trading system or market now available or later developed. It should be appreciated that a trading environment, such as a futures exchange as described herein, implements one or more economic markets where rights and obligations may be traded. As such, a trading environment may be characterized by a need to maintain market integrity, transparency, predictability, fair/equitable access and participant expectations with respect thereto. For example, an exchange must respond to inputs, such as trader orders, cancelations, etc., in a manner as expected by the market participants, such as based on market data, e.g., prices, available counter-orders, etc., to provide an expected level of certainty that transactions will occur in a consistent and predictable manner and without unknown or unascertainable risks. In addition, it should be appreciated that electronic trading systems further impose additional expectations and demands by market participants as to transaction processing speed, latency, capacity and response time, while creating additional complexities relating thereto. Accordingly, as will be described, the disclosed embodiments may further include functionality to ensure that the expectations of market participants are met, e.g., that transactional integrity and predictable system responses are maintained.

As was discussed above, electronic trading systems ideally attempt to offer an efficient, fair and balanced market where market prices reflect a true consensus of the value of products traded among the market participants, where the intentional or unintentional influence of any one market participant is minimized if not eliminated, and where unfair or inequitable advantages with respect to information access are minimized if not eliminated.

Although described below in connection with examples involving instruments having multiple components, such as calendar and butterfly spread instruments, the methods described herein are well suited for determining final values for any variety of objects conforming to a set of rules or relationships.

Generally, the disclosed embodiments may be applicable to any computer processing system that is constrained by a variety of rules and data values. When a computer processor attempts to compute a large number of data sets in an environment including rules constraints and data constraints, the number of possible solutions or combinations of values can become unwieldy. The disclosed embodiments allow for the computer processing system to accurately parse and efficiently provide order tickets to users. The disclosed embodiments allow for greater efficiency for end users, less processing time spent on parsing, and quicker generation of orders allowing the market to function efficiency.

The disclosed embodiments may be applicable to contracts for any type of underlier, commodity, equity, option, or futures trading system or market now available or later developed. The disclosed embodiments are also not limited to intra-market spread instruments, and accordingly may also be used in connection with inter-market spread instruments for contracts associated with different commodities.

While the disclosed embodiments may be described in reference to the CME, it should be appreciated that these embodiments are applicable to any exchange. Such other exchanges may include a clearing house that, like the CME clearing house, clears, settles and guarantees all matched transactions in contracts of the exchange occurring through its facilities. In addition, such clearing houses establish and monitor financial requirements for clearing members and convey certain clearing privileges in conjunction with the relevant exchange markets.

The disclosed embodiments are also not limited to uses by a clearing house or exchange for purposes of generating an order ticket. The disclosed embodiments may be used for monitoring multiple messages and building a transaction or function based on information included within a set of separate messages.

The methods and systems described herein may be integrated or otherwise combined with various risk management methods and systems, such as the risk management methods and systems described in U.S. Pat. No. 7,769,667 entitled "System and Method for Activity Based Margining" (the '667 Patent"), the entire disclosure of which is incorporated by reference herein and relied upon. For example, the methods and systems described herein may be configured as a component or module of the risk management systems described in the above-referenced patent. Alternatively, or additionally, the disclosed methods may generate data to be provided to the systems described in the above-referenced patent. For example, the settlement prices determined by the disclosed embodiments may be incorporated into margin requirement(s) determined by the risk management method or system.

In one embodiment, the disclosed methods and systems are integrated or otherwise combined with the risk management system implemented by CME called Standard Portfolio Analysis of Risk™ (SPAN®). The SPAN system bases performance bond requirements on the overall risk of the portfolios using parameters as determined by CME's Board of Directors, and thus represents a significant improvement over other performance bond systems, most notably those that are "strategy-based" or "delta-based." Further details regarding SPAN are set forth in the '667 Patent.

The embodiments may be described in terms of a distributed computing system. The particular examples identify a specific set of components useful in a futures and options exchange. However, many of the components and inventive features are readily adapted to other electronic trading environments. The specific examples described herein may teach specific protocols and/or interfaces, although it should be understood that the principles involved may be extended to, or applied in, other protocols and interfaces.

It should be appreciated that the plurality of entities utilizing or involved with the disclosed embodiments, e.g., the market participants, may be referred to by other nomenclature reflecting the role that the particular entity is performing with respect to the disclosed embodiments and that a given entity may perform more than one role depending upon the implementation and the nature of the particular transaction being undertaken, as well as the entity's contractual and/or legal relationship with another market participant and/or the exchange.

An exemplary trading network environment for implementing trading systems and methods is shown in FIG. 1. An exchange computer system 100 receives messages that include orders and transmits market data related to orders and trades to users, such as via wide area network 126 and/or local area network 124 and computer devices 114, 116, 118, 120 and 122, as will be described below, coupled with the exchange computer system 100.

Herein, the phrase "coupled with" is defined to mean directly connected to or indirectly connected through one or more intermediate components. Such intermediate components may include both hardware and software based components. Further, to clarify the use in the pending claims and to hereby provide notice to the public, the phrases "at least one of <A>, <B>, . . . and <N>" or "at least one of <A>, <B>, . . . <N>, or combinations thereof" are defined by the Applicant in the broadest sense, superseding any other implied definitions here before or hereinafter unless expressly asserted by the Applicant to the contrary, to mean one or more elements selected from the group comprising A, B, . . . and N, that is to say, any combination of one or more of the elements A, B, . . . or N including any one element alone or in combination with one or more of the other elements which may also include, in combination, additional elements not listed.

The exchange computer system 100 may be implemented with one or more mainframe, desktop or other computers, such as the example computer 200 described below with respect to FIG. 2. A user database 102 may be provided which includes information identifying traders and other users of exchange computer system 100, such as account numbers or identifiers, user names and passwords. An account data module 104 may be provided which may process account information that may be used during trades.

A match engine module 106 may be included to match bid and offer prices and may be implemented with software that executes one or more algorithms for matching bids and offers. A trade database 108 may be included to store information identifying trades and descriptions of trades. In particular, a trade database may store information identifying the time that a trade took place and the contract price. An order book module 110 may be included to compute or otherwise determine current bid and offer prices, e.g., in a continuous auction market, or also operate as an order accumulation buffer for a batch auction market. A market data module 112 may be included to collect market data and prepare the data for transmission to users.

A risk management module 134 may be included to compute and determine a user's risk utilization in relation to the user's defined risk thresholds. The risk management module 134 may also be configured to determine risk assessments or exposure levels in connection with positions held by a market participant.

The risk management module 134 may be configured to administer, manage or maintain one or more margining mechanisms implemented by the exchange computer system 100. Such administration, management or maintenance may include managing a number of database records reflective of margin accounts of the market participants. In some embodiments, the risk management module 134 implements one or more aspects of the disclosed embodiments, including, for instance, principal component analysis (PCA) based margining, in connection with interest rate swap (IRS) portfolios, as described below.

An order processing module 136 may be included to decompose delta-based, spread instrument, bulk and other types of composite orders for processing by the order book module 110 and/or the match engine module 106. The order processing module 136 may also be used to implement one or more procedures related to clearing an order.

A settlement module 140 (or settlement processor or other payment processor) may be included to provide one or more functions related to settling or otherwise administering transactions cleared by the exchange. Settlement module 140 of the exchange computer system 100 may implement one or more settlement price determination techniques. Settlement-related functions need not be limited to actions or events occurring at the end of a contract term. For instance, in some embodiments, settlement-related functions may include or involve daily or other mark to market settlements for margining purposes. In some cases, the settlement module 140 may be configured to communicate with the trade database 108 (or the memory(ies) on which the trade database 108 is stored) and/or to determine a payment amount based on a spot price, the price of the futures contract or other financial instrument, or other price data, at various times. The determination may be made at one or more points in time during the term of the financial instrument in connection with a margining mechanism. For example, the settlement module 140 may be used to determine a mark to market amount on a daily basis during the term of the financial instrument. Such determinations may also be made on a settlement date for the financial instrument for the purposes of final settlement.

In some embodiments, the settlement module 140 may be integrated to any desired extent with one or more of the other modules or processors of the exchange computer system 100. For example, the settlement module 140 and the risk management module 134 may be integrated to any desired extent. In some cases, one or more margining procedures or other aspects of the margining mechanism(s) may be implemented by the settlement module 140.

An integration application 314 may be included to provide one or more functions relating to monitoring and validating communications over a plurality of different communication platforms. The integration application 314 may generate order tickets from validated communications. The integration application 314 may monitor communications directly or indirectly. The integration application 314 may reside on the exchange and may communicate with integration clients that are integrated with chat applications located at each communication client. The integration application 314 may be implemented at the server of a chat service provider. The integration application 314 may be connected to the exchange over a network.

One skilled in the art will appreciate that one or more modules described herein may be implemented using, among other things, a tangible computer-readable medium comprising computer-executable instructions (e.g., executable software code). Alternatively, modules may be implemented as software code, firmware code, specifically configured hardware or processors, and/or a combination of the aforementioned. For example, the modules may be embodied as part of an exchange 100 for financial instruments. It should be appreciated the disclosed embodiments may be implemented as a different or separate module of the exchange computer system 100, or a separate computer system coupled with the exchange computer system 100 so as to have access to margin account record, pricing, and/or other data. As described above, the disclosed embodiments may be implemented as a centrally accessible system or as a distributed system, e.g., where some of the disclosed functions are performed by the computer systems of the market participants.

The trading network environment shown in FIG. 1 includes exemplary computer devices 114, 116, 118, 120 and 122 which depict different exemplary methods or media by which a computer device may be coupled with the exchange computer system 100 or by which a user may communicate, e.g., send and receive, trade or other information therewith. It should be appreciated that the types of computer devices deployed by traders and the methods and media by which they communicate with the exchange computer system 100 is implementation dependent and may vary and that not all of the depicted computer devices and/or means/media of communication may be used and that other computer devices and/or means/media of communications, now available or later developed may be used. Each computer device, which may comprise a computer 200 described in more detail below with respect to FIG. 2, may include a central processor, specifically configured or otherwise, that controls the overall operation of the computer and a system bus that connects the central processor to one or more conventional components, such as a network card or modem. Each computer device may also include a variety of interface units and drives for reading and writing data or files and communicating with other computer devices and with the exchange computer system 100. Depending on the type of computer device, a user can interact with the computer with a keyboard, pointing device, microphone, pen device or other input device now available or later developed.

An exemplary computer device 114 is shown directly connected to exchange computer system 100, such as via a T1 line, a common local area network (LAN) or other wired and/or wireless medium for connecting computer devices, such as the network 220 shown in FIG. 2 and described below with respect thereto. The exemplary computer device 114 is further shown connected to a radio 132. The user of radio 132, which may include a cellular telephone, smart phone, or other wireless proprietary and/or non-proprietary device, may be a trader or exchange employee. The radio user may transmit orders or other information to the exemplary computer device 114 or a user thereof. The user of the exemplary computer device 114, or the exemplary computer device 114 alone and/or autonomously, may then transmit the trade or other information to the exchange computer system 100.

Exemplary computer devices 116 and 118 are coupled with a local area network ("LAN") 124 which may be configured in one or more of the well-known LAN topologies, e.g., star, daisy chain, etc., and may use a variety of different protocols, such as Ethernet, TCP/IP, etc. The exemplary computer devices 116 and 118 may communicate with each other and with other computer and other devices which are coupled with the LAN 124. Computer and other devices may be coupled with the LAN 124 via twisted pair wires, coaxial cable, fiber optics or other wired or wireless media. As shown in FIG. 1, an exemplary wireless personal digital assistant device ("PDA") 122, such as a mobile telephone, tablet based compute device, or other wireless device, may communicate with the LAN 124 and/or the Internet 126 via radio waves, such as via Wi-Fi, Bluetooth and/or a cellular telephone based data communications protocol. PDA 122 may also communicate with exchange computer system 100 via a conventional wireless hub 128.

FIG. 1 also shows the LAN 124 coupled with a wide area network ("WAN") 126 which may be comprised of one or more public or private wired or wireless networks. In one embodiment, the WAN 126 includes the Internet 126. The LAN 124 may include a router to connect LAN 124 to the Internet 126. Exemplary computer device 120 is shown coupled directly to the Internet 126, such as via a modem, DSL line, satellite dish or any other device for connecting a computer device to the Internet 126 via a service provider therefore as is known. LAN 124 and/or WAN 126 may be the same as the network 220 shown in FIG. 2 and described below with respect thereto.

Users of the exchange computer system 100 may include one or more market makers 130 which may maintain a market by providing constant bid and offer prices for a derivative or security to the exchange computer system 100, such as via one of the exemplary computer devices depicted. The exchange computer system 100 may also exchange information with other match or trade engines, such as trade engine 138. One skilled in the art will appreciate that numerous additional computers and systems may be coupled to exchange computer system 100. Such computers and systems may include clearing, regulatory and fee systems.

The operations of computer devices and systems shown in FIG. 1 may be controlled by computer-executable instructions stored on a non-transitory computer-readable medium. For example, the exemplary computer device 116 may store computer-executable instructions for receiving order information from a user, transmitting that order information to exchange computer system 100 in electronic messages, extracting the order information from the electronic messages, executing actions relating to the messages, and/or calculating values from characteristics of the extracted order to facilitate matching orders and executing trades. In another example, the exemplary computer device 118 may include computer-executable instructions for receiving market data from exchange computer system 100 and displaying that information to a user. In another example, the exemplary computer device 118 may include a non-transitory computer-readable medium that stores instructions for predicting and/or publishing a current response time or current match engine latency as described herein.

Numerous additional servers, computers, handheld devices, personal digital assistants, telephones and other devices may also be connected to exchange computer system 100. Moreover, one skilled in the art will appreciate that the topology shown in FIG. 1 is merely an example and that the components shown in FIG. 1 may include other components not shown and be connected by numerous alternative topologies.

Figure 2:
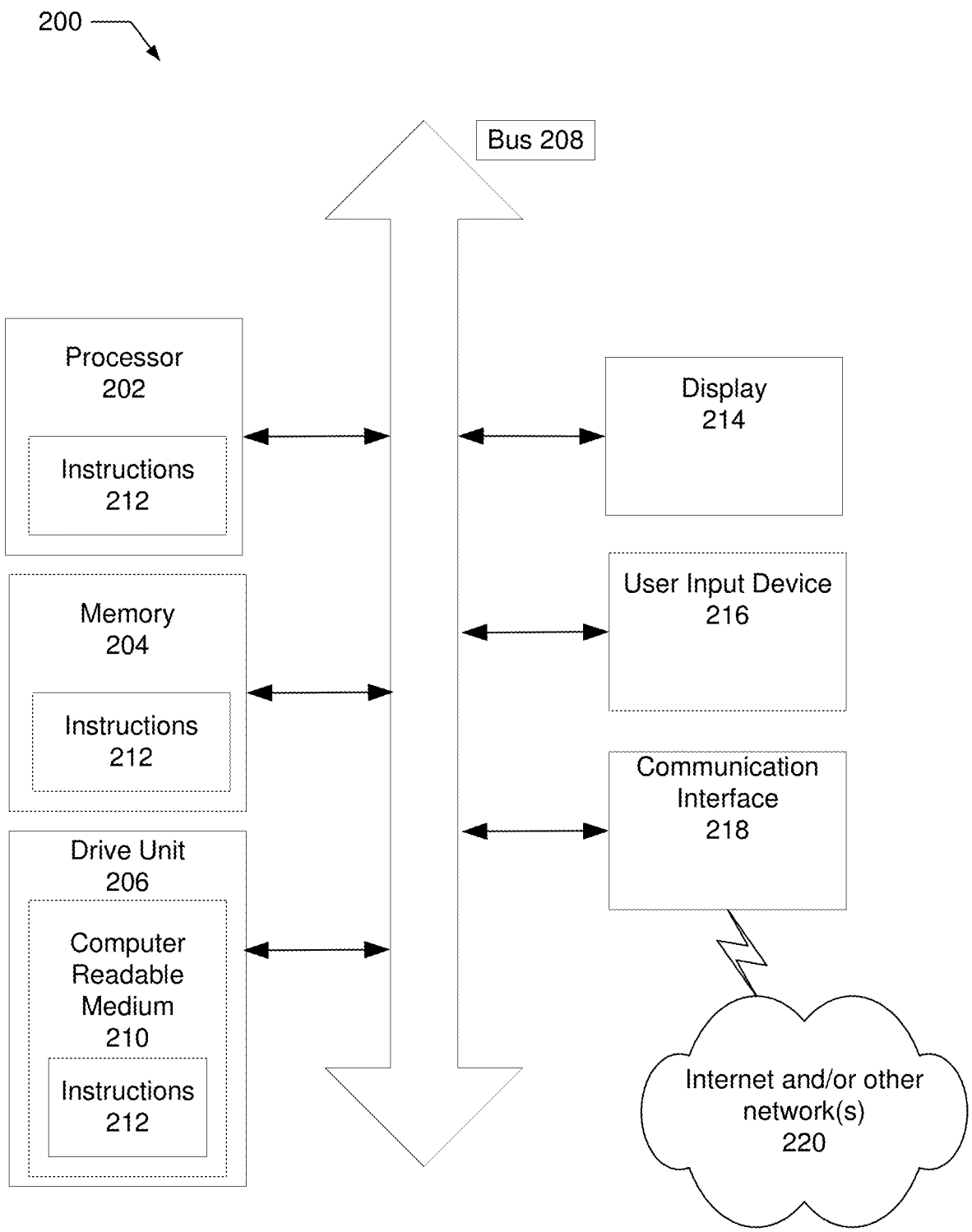
FIG. 2 depicts a general computer system, according to some embodiments.

Referring to FIG. 2, an illustrative embodiment of a general computer system 200 is shown. The computer system 200 can include a set of instructions that can be executed to cause the computer system 200 to perform any one or more of the methods or computer based functions disclosed herein. The computer system 200 may operate as a standalone device or may be connected, e.g., using a network, to other computer systems or peripheral devices. Any of the components discussed above, such as the processor 202, may be a computer system 200 or a component in the computer system 200. The computer system 200 may be specifically configured to implement a match engine, margin processing, payment or clearing function on behalf of an exchange, such as the Chicago Mercantile Exchange, of which the disclosed embodiments are a component thereof.

In a networked deployment, the computer system 200 may operate in the capacity of a server or as a client user computer in a client-server user network environment, or as a peer computer system in a peer-to-peer (or distributed) network environment. The computer system 200 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 200 can be implemented using electronic devices that provide voice, video or data communication. Further, while a single computer system 200 is illustrated, the term "system" shall also be taken to include any collection of systems or sub-systems that individually or jointly execute a set, or multiple sets, of instructions to perform one or more computer functions.

As illustrated in FIG. 2, the computer system 200 may include a processor 202, e.g., a central processing unit (CPU), a graphics processing unit (GPU), or both. The processor 202 may be a component in a variety of systems. For example, the processor 202 may be part of a standard personal computer or a workstation. The processor 202 may be one or more general processors, digital signal processors, specifically configured processors, application specific integrated circuits, field programmable gate arrays, servers, networks, digital circuits, analog circuits, combinations thereof, or other now known or later developed devices for analyzing and processing data. The processor 202 may implement a software program, such as code generated manually (i.e., programmed).

The computer system 200 may include a memory 204 that can communicate via a bus 208. The memory 204 may be a main memory, a static memory, or a dynamic memory. The memory 204 may include, but is not limited to, computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one embodiment, the memory 204 includes a cache or random access memory for the processor 202. In alternative embodiments, the memory 204 is separate from the processor 202, such as a cache memory of a processor, the system memory, or other memory. The memory 204 may be an external storage device or database for storing data. Examples include a hard drive, compact disc ("CD"), digital video disc ("DVD"), memory card, memory stick, floppy disc, universal serial bus ("USB") memory device, or any other device operative to store data. The memory 204 is operable to store instructions executable by the processor 202. The functions, acts or tasks illustrated in the figures or described herein may be performed by the programmed processor 202 executing the instructions 212 stored in the memory 204. The functions, acts or tasks are independent of the particular type of instructions set, storage media, processor or processing strategy and may be performed by software, hardware, integrated circuits, firm-ware, microcode and the like, operating alone or in combination. Likewise, processing strategies may include multiprocessing, multitasking, parallel processing and the like.

As shown, the computer system 200 may further include a display unit 214, such as a liquid crystal display (LCD), an organic light emitting diode (OLED), a flat panel display, a solid state display, a cathode ray tube (CRT), a projector, a printer or other now known or later developed display device for outputting determined information. The display 214 may act as an interface for the user to see the functioning of the processor 202, or specifically as an interface with the software stored in the memory 204 or in the drive unit 206.

Additionally, the computer system 200 may include an input device 216 configured to allow a user to interact with any of the components of system 200. The input device 216 may be a number pad, a keyboard, or a cursor control device, such as a mouse, or a joystick, touch screen display, remote control or any other device operative to interact with the system 200.

In a particular embodiment, as depicted in FIG. 2, the computer system 200 may also include a disk or optical drive unit 206. The disk drive unit 206 may include a computer-readable medium 210 in which one or more sets of instructions 212, e.g., software, can be embedded. Further, the instructions 212 may embody one or more of the methods or logic as described herein. In a particular embodiment, the instructions 212 may reside completely, or at least partially, within the memory 204 and/or within the processor 202 during execution by the computer system 200. The memory 204 and the processor 202 also may include computer-readable media as discussed above.

The present disclosure contemplates a computer-readable medium that includes instructions 212 or receives and executes instructions 212 responsive to a propagated signal, so that a device connected to a network 220 can communicate voice, video, audio, images or any other data over the network 220. Further, the instructions 212 may be transmitted or received over the network 220 via a communication interface 218. The communication interface 218 may be a part of the processor 202 or may be a separate component. The communication interface 218 may be created in software or may be a physical connection in hardware. The communication interface 218 is configured to connect with a network 220, external media, the display 214, or any other components in system 200, or combinations thereof. The connection with the network 220 may be a physical connection, such as a wired Ethernet connection or may be established wirelessly as discussed below. Likewise, the additional connections with other components of the system 200 may be physical connections or may be established wirelessly.

The network 220 may include wired networks, wireless networks, or combinations thereof. The wireless network may be a cellular telephone network, an 802.11, 802.16, 802.20, or WiMax network. Further, the network 220 may be a public network, such as the Internet, a private network, such as an intranet, or combinations thereof, and may utilize a variety of networking protocols now available or later developed including, but not limited to, TCP/IP based networking protocols.

Embodiments of the subject matter and the functional operations described in this specification may be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a computer readable medium for execution by, or to control the operation of, data processing apparatus. While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein. The computer readable medium can be a machine-readable storage device, a machine-readable storage substrate, a memory device, or a combination of one or more of them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated or otherwise specifically configured hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and anyone or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well. Feedback provided to the user can be any form of sensory feedback, e.g., visual feedback, auditory feedback, or tactile feedback. Input from the user can be received in any form, including acoustic, speech, or tactile input.

Embodiments of the subject matter described in this specification can be implemented in a computing system that includes a back end component, e.g., a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other. A system may depend on certain rules, logic, and inter-related objects and data. In technical and computing environments, a system may calculate values for multiple objects subject to rules, e.g., business or environment logic, associated with the objects. Certain object types may also depend on other object types.

Figure 3:
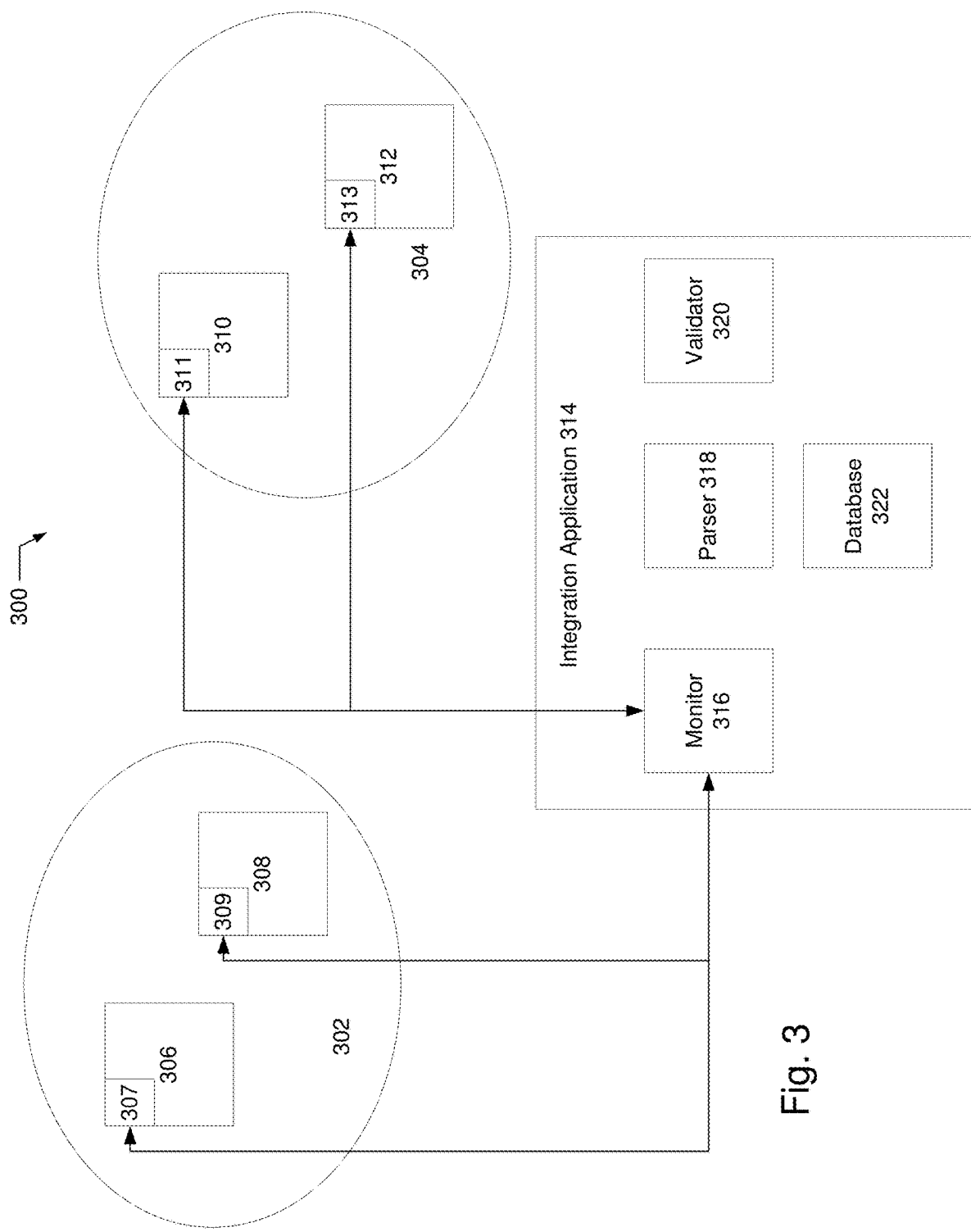
FIG. 3 depicts a block diagram of an integration application, according to some embodiments.

FIG. 3 depicts an illustrative embodiment of a system 300 including communication platforms 302 and 304. System 300 includes communication clients 306 and 308 that are registered with communication platform 302 and have installed thereon communication platform 302 software that enables communication clients 306 and 308 to communicate with each other over communication platform 302. System 300 also includes communication clients 310 and 312 that are registered with communication platform 304 and have installed thereon communication platform 304 software that enables communication clients 310 and 312 to communicate with each other over communication platform 304.

Communication platforms 302 and 304 are not configured to allow cross platform communications. For example, communication platform 302 may be WhatsApp®, and communication platform 304 may be Facebook®. A trader interested in a financial instrument may advertise his trading strategy in communication platform 302 using communication client 306, e.g., in a group chat, and other communication clients 308 may automatically receive the entered trading strategy, or entered communications.

System 300 includes integration application 314 that is configured to communicate with each of the communication clients 306, 308, 310 and 312. In particular, the integration application 314 is configured to communicate with an integration client that is installed on each of the communication clients. As shown in FIG. 3, communication clients 306, 308, 310 and 312 include integration clients 307, 309, 311 and 313, respectively. The integration client may be implemented as an application programming interface or a graphical user interface on each communication client. The integration client may be software installed on a communication client that is permissioned, e.g., by the chat platform software installed on the communication client, to transmit communications entered into the communication client to integration application 314.

Integration application 314 includes chat monitor 316, communications parser 318, protocol validator 320, and database 322. The integration application 314 may be connected to systems or machines outside the exchange system. The integration application 314 may communicate with users, traders, and brokers outside of the exchange system, such as via wide area network 126 and/or local area network 124 and computer devices 114, 116, 118, 120 and 122. The integration application 314 may be configured to monitor chat communications entered into a plurality of communication clients over a plurality of communication platforms, parse the communications and identify a communication protocol, validate communications using the communication protocol, and transmit validated communications between communication clients of different/incongruent communication platforms. The integration application may be configured to store communications using the communication protocol in database 322, and retrieve previously entered communications that use the communication protocol and relate to a particular instrument, e.g., a financial instrument. The integration application 314 may be implemented in part as an application on one of the computer devices 114, 116, 118, 120 and 122. The integration application 314 may be part of the exchange computer system 100.

The chat monitor 316 may be configured to monitor communications entered into the communication clients 306, 308, 310 and 312 across the multiple communication platforms 302 and 304. The communications parser 318 may be configured to parse communications that are monitored by the chat monitor 316. The protocol validator 320 may be configured to determine whether communications that use the communication protocol conform to the communication protocol. The communication protocol may include a plurality of elements, including primary elements, supplementary elements, and resolution elements, as discussed in further detail in connection with FIG. 4. When a validated communication includes resolution elements from two different communication clients, the integration application may transmit orders for execution to a clearing house computer system, generate order confirmations, and transmit the order confirmations to the communication clients.

The chat monitor 316 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the chat monitor 316 to, or otherwise be operative to, monitor a plurality of communications. The chat monitor may be configured to communicate with integration clients installed on communication clients. As described above, the integration client may be software installed on a communication client that is permissioned, e.g., by the chat platform software installed on the communication client, to transmit communications entered into the communication client to the chat monitor 316. The chat monitor 316 may accordingly be configured to receive communications entered into different communication clients on different communication platforms.

The communications parser 318 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the communications parser 318 to, or otherwise be operative to, identify from the plurality of communications, use of the communication protocol.

Figure 4:
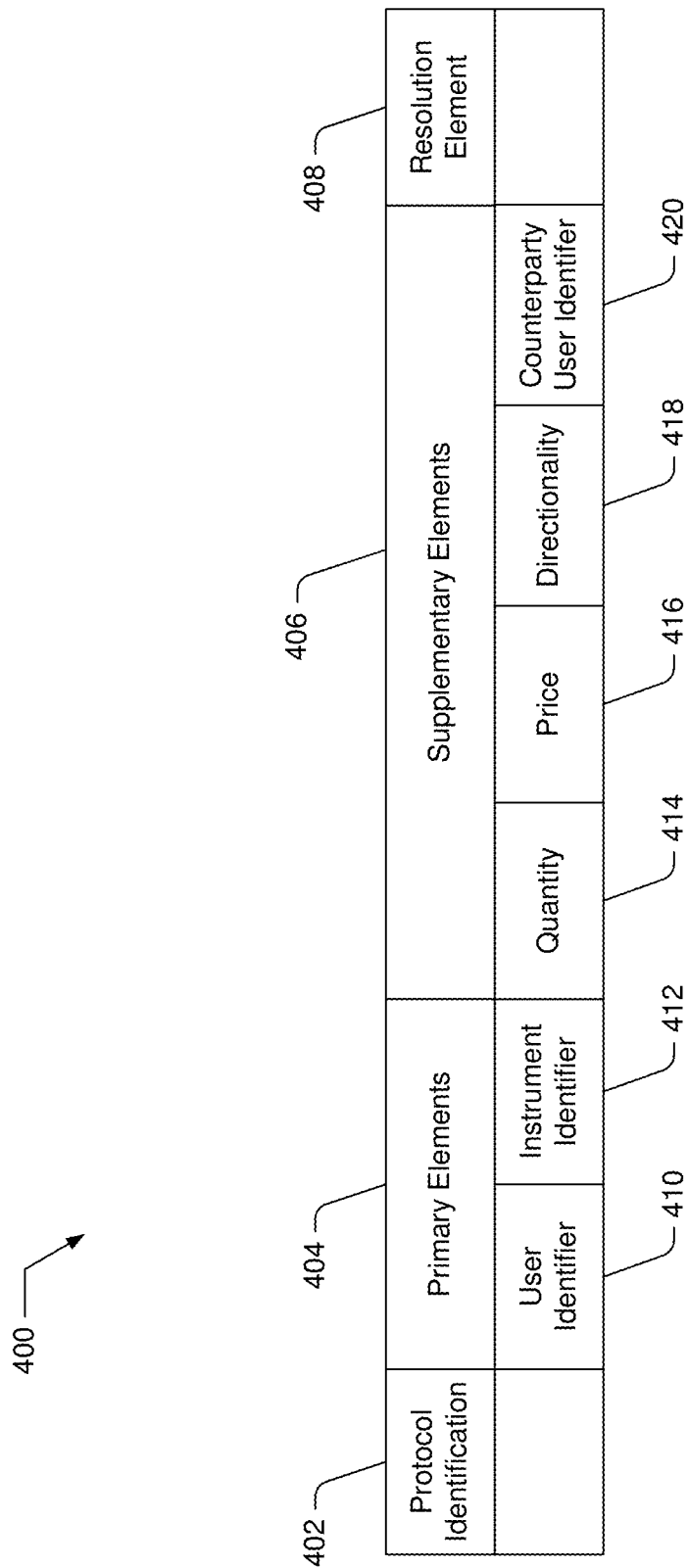
FIG. 4 depicts an example of a communication protocol structure, according to some embodiments.

FIG. 4 illustrates an example implementation of a communication protocol structure 400 used in conjunction with the disclosed integration application. Protocol structure 400 includes a protocol identifier 402, primary protocol elements 404, supplementary protocol elements 406, and a resolution element 408. Implementing communication protocol structure 200 contemplates the use of delimiters to demarcate each field/element, so that datum can be isolated from each other and extracted by the communications parser 318. The use of delimiters and templates in communication protocol structure 400 may enable the structure to be readily extensible.

As will be described in further detail below, some of the elements of the protocol may be required elements, and others may be optional. Some elements may be necessary to transmit communications from one communication client to another communication client. Other elements of the communication protocol 400 may be required to complete an order between two users utilizing communication clients over two disparate/different communication platforms.

The communication protocol may be specifically implemented to enable more efficient and improved bilateral transactions in OTC markets. The communication protocol may be a nested protocol that may allow for users of communication clients to add an increasing amount of information in subsequent communications conforming to the communication protocol. As shown in FIG. 4, primary protocol elements may include a user identifier 410 and a financial instrument identifier 412. The financial instrument 412 may specify a commodity, quality, and/or expiration for a financial instrument. Supplementary protocol elements 406 may include a quantity 414, price 416, and a directionality/side (e.g., long or short, or buy or sell) 418. Supplementary protocol elements 406 may also include a counterparty user identifier field 420, which lets a user specify which other user is being specifically targeted in a communication. The resolution element 408 may allow a user to specify whether a proposed transaction is agreed to, confirmed, or canceled.

Each user that uses the communication client/communication protocols may need to register with the exchange computing system 100 before using the communication protocol. The protocol validator may check/validate whether a user submitting a communication including the communication protocol is a registered user of the communication client.

The communications parser 318 may use a standard off the shelf or a proprietary parser. The communications parser 318 may only parse a single line at a time (e.g. a line by line parser). The communications parser 318 may parse and identify communications as using, or invoking, the communication protocol based on a protocol identifier, which may be a symbol or character, e.g., #. Those skilled in the art will realize that many other additional characters may be utilized to as a protocol identifier to signal the use of the communication protocol.

The communication protocol may include many different fields separated by delimiters. In one embodiment, "_" is a delimiter for separating protocol elements. A delimiter may separate data elements within a given communication protocol structure. Those skilled in the art will realize that many other additional characters may be utilized to represent a delimiter such as characters "[", "]" and "}".

The communication protocol may be of variable length with data elements shortened or extended in length, as well as included or not present on a real-time per communication basis. In other words, communications including only a subset of the elements illustrated in communication protocol structure 400 may be considered to be a valid communication, i.e., a communication that conforms to the disclosed communication protocol which can be parsed by the parser 318.

The protocol validator 320 may be implemented as a separate component or as one or more logic components, such as on an FPGA which may include a memory or reconfigurable component to store logic and a processing component to execute the stored logic, or as first logic, e.g. computer program logic, stored in a memory, such as the memory 204 shown in FIG. 2 and described in more detail above with respect thereto, or other non-transitory computer readable medium, and executable by a processor, such as the processor 202 shown in FIG. 2 and described in more detail above with respect thereto, to cause the protocol validator 320 determine whether a communication using the protocol identifier 402 is a valid communication. In one embodiment, a communication that uses the protocol identifier may only be considered valid if the communication also includes the primary elements of communication protocol 400. For example, in one embodiment, the protocol validator 320 may validate a communication that only includes elements 402 and 404. For example, a communication may comprise:

Communication 1: #Ay428_CrudeOil where # is the protocol identifier and _ is a delimiter separating various protocol elements. Based on the use of the protocol identifier 402, namely, #, parser 318 identifiers communication 1 as a communication including two elements. The first element, identified by the parser 318 as the content between # and _, is detected as the user identifier 410, namely, "Ay428". The second element is the instrument identifier 412, namely, "CrudeOil".

The protocol validator 320 validates communication 1 because it correctly utilizes the communication protocol 400 by including the protocol identifier 402 and the primary elements 404, and in particular, a user identifier and an instrument identifier.

It should be appreciated that the protocol validator 320 uses a specific set of rules to validate a communication. The validation rules may depend on the contents of the communication. In one embodiment, one ruleset for a communication is that it must include the protocol identifier and the primary protocol elements. Alternatively, or in addition thereto, if a communication includes a resolution element, then the communication must also include supplementary protocol elements.

In operation, the integration application detects the use of the protocol identifier 402 in a new communication entered into a communication client. Upon determining that the use of the communication protocol is valid, the integration application 314 adds the communication to the database 322. The integration application may also retrieve other previously received communications from the database based on the instrument identifier and transmits the retrieved communications to the communication client.

One or more of the functions ascribed to the integration application 314 may be performed by the integration clients installed on each integration client. Accordingly, the integration client and the integration application should be understood to work together and share data and resources as necessary. For example, the monitor 316, parser 318 and validator 320 may be a part of each of the integration clients. The integration clients are configured to communicate information to each other and may do so by way of the integration application, which may be a centralized application for sharing data between the plurality of integration clients.

Figure 5:
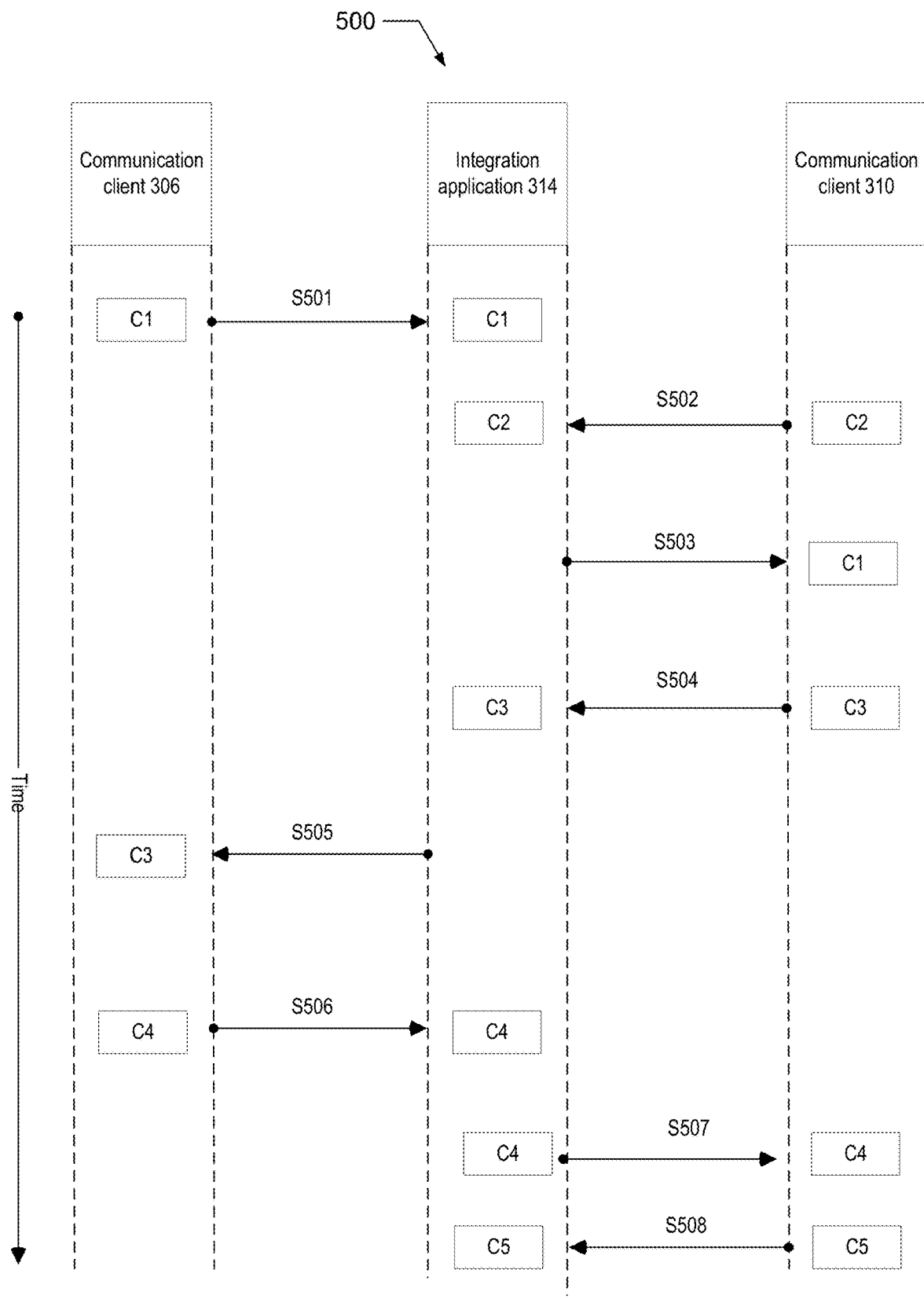
FIG. 5 depicts an example diagram of data flowing between communication clients and an integration application, according to some embodiments.

FIG. 5 illustrates an example diagram that illustrates an example data flow between communication clients and the integration application. The communication clients may be clients for any of the variety of communication platforms discussed herein, e.g., text messaging, instant messaging, social media applications, etc. The communication clients may allow for direct messaging (e.g., person to person) or may enable group chats (e.g., one to many communications). As shown in FIG. 5, a communication C1 is entered into the communication client 306. Communication C1 may include protocol identifier 402, e.g., "#". Communication C1 may comprise:

C1: #Ay428_CrudeOil

C1 indicates that a user Ay428 is interested in bilaterally transacting on a financial instrument CrudeOil. At stage S501, integration client 307, installed on the communication client 306 as described above, transmits the communication to the integration application 314. Integration application monitors all communications entered into the communication clients via the integration clients. The integration application detects communication C1 as using the protocol identifier 402. Alternatively, as described above, the integration client 307 installed on the communication client 306 may detect the use of the protocol identifier 402. The integration application validates the use of the protocol identifier, e.g., ensures that the communication C1 includes the primary elements (which may be required elements) 404.

The integration application maintains, in database 322, a list of all registered users interested in the financial instrument CrudeOil. The integration application also validates that user Ay428 is a registered user of the integration application. The integration application updates database 322 to include C1 after validating C1.

A communication C2 is entered into the communication client 310. As described above communication client 310 is on a different communication platform than communication client 306. Communication C2 may also include protocol identifier 402, e.g., "#". Communication C2 may comprise:

C2: #Gr625_CrudeOil.

C2 indicates that a user Gr625 is interested in bilaterally transacting on a financial instrument CrudeOil. At stage S502, integration client 311, installed on the communication client 310 as described above, transmits the communication to the integration application 314. The integration application updates database 322 to include C2 after validating C2. The integration application also searches for the unique financial instrument identifier in C2, namely, CrudeOil, in the database 322, and retrieves previously entered communications related to that financial instrument, i.e., the integration application retrieves C1.

At stage S503, the integration application transmits C1 to communication client 310. C1 may be displayed in a display or user interface associated with communication client 310. The chat application may be the same chat application into which the user associated with communication client 310, e.g., Gr625, entered communication C2.

As described above communication clients 306 and 310 are on two different communication platforms 302 and 304, respectively, which are not configured to communicate with each other. Accordingly, the communication client 310 now has received information about CrudeOil entered into a communication client 306 by user Ay428 on a different communication platform.

In one embodiment, the communications C2 may also be transmitted to communication client 306. For example, user Ay428 may be associated with a user profile stored in database 322. User Ay428's profile may specify that any communications received by the integration application subsequent to and within a certain time after a communication entered by Ay428 should be sent to user Ay428. Accordingly, if C2 is received by integration application 314 within a certain time after C1 is received by integration application 314, integration application 314 transmits C2 to communication client 306.

The user of communication client 310, upon receiving C1, may enter in a communication client C3 into communication client 310. Communication C3 may comprise:

C3: #Gr625_CrudeOil_500_12_buy

In particular, communication C3 includes a previously entered communication, namely, C2, followed by additional supplemental elements. For example, user Gr625, after learning of Ay428's activity regarding the financial instrument CrudeOil (e.g., activity related to C1), may be interested in proposing/advertising a more specific transaction for CrudeOil, where the additional specificity is listed in the supplemental elements "500_12_buy" of C3. In particular, supplemental elements 500_12_buy indicate transaction level details proposed by user Gr625, e.g., that the user is interested in buying 500 units (or lots, or shares) at a price of 12 of the financial instrument CrudeOil.

User Gr625's communication client may be configured to allow the user to simply click on, or touch, or otherwise interact with C2 so as to be able to easily copy and paste C2 into the communication client. The user can thereafter add/append the supplemental elements to the copied and pasted instance of C2, before sending communication C3 to the integration application. Alternatively, the user Gr625 may retype, e.g., using a keyboard (implemented in hardware or software), the contents of the previous communication C2, and thereafter add/append the supplemental elements to the retyped instance of C2, before sending communication C3 to the integration application.

At stage S504, communication C3 is transmitted to the integration application. The specific format of C3 is detected by the integration application. For example, the integration application's parser may be configured to detect five different communication protocol elements separated by delimiter "_" following the protocol identifier "#". The integration application updates database 322 to include C3 after validating C3. The communication parser 318 detects that C3 includes supplementary elements.

In one embodiment, the integration application 314 may transmit communications including supplementary elements for a particular financial instrument to any communication clients that have previously transmitted communications for that financial instrument. Accordingly, the integration application routes communication C3 at stage S505 to communication client 306. Communication C3 may be displayed on a user interface device, e.g., display, associated with communication client 306.

User Ay428 (e.g., the user associated with communication client 306) may agree to the transaction proposed by user Gr625 via C3. User Ay428 may enter communication C4 into the communication client 306. If user Ay428 agrees to the transaction proposed in C3, communication C4 may comprise:

C4: #Ay428_CrudeOil_Gr625_CrudeOil_500_12_buy_!

In particular, communication C4 includes previously entered communications, namely, C1 appended by, or followed by, C3, followed by a resolution element "!". In the specific communication protocol disclosed herein, a resolution element may allow a user to signal commitment to, or a rejection of, a proposed transaction. "!" may be a commitment element. If a user disagreed to a proposed transaction, the user may use a different resolution element, e.g., "%", that signals non-agreement.

At stage S506, communication C4 is transmitted to the integration application. Integration application validates communication C4, e.g., by confirming that the protocol elements present in C4 conform to the communication protocol 400. Because C4 includes a resolution element, integration application 314 transmits, at stage S507, C4 to communication client 310.

In one embodiment, upon detecting the resolution element in C4, the integration application checks if the communications detected in/referenced in C4 are still active communications/quotes in the database 322. If for example Gr625 has canceled the trade proposed in C3, protocol validator 320 may not validate C4.

Upon receiving communications C4, user Gr625 may enter communications C5 into the communication client 310. Communication C5 may comprise:

C5:
Ay428_CrudeOil_Gr625_CrudeOil_500_12_buy_!_!

In particular, communication C5 includes previously entered communications, namely, C4, appended by, or followed by another resolution element "!" At stage S508, communication C5 is transmitted to the integration application. Integration application validates communication C5, e.g., by confirming that the protocol elements present in C5 conform to the communication protocol 400. In particular, the integration application detects two resolution elements in C5, namely, the "!" entered in by Gr625 in response to the "!" entered in by user Ay428 (as part of communication C4). Thus, the integration application detects that both users have agreed to the proposed bilateral transaction. The integration application may generate confirmation messages and transmit same to the two users Ay428 and Gr625. The integration application may send the completed order, which both parties have agreed to, to a clearinghouse.

In one embodiment, the integration application may only validate communications that signal agreement and commitment if the communications are entered within a certain amount of time of each other. For example, the integration application may only validate C5, and thus cause execution of bilateral transaction, if C5 is received within a timeframe, e.g., one minute, after sending C4 to communication client 310. This time limit may be configurable. Alternatively, this time limit for signaling commitment may be fixed for all registered users of the integration application.

In one embodiment, if user Ay428 had disagreed or rejected the transaction proposed by user Gr625 in communication C3, communication C4 may have comprised:

C4:
Ay428_CrudeOil_Gr625_CrudeOil_500_12_buy_%

Thus, the communication protocol may allow users to directly message each other by including each other's user identifiers in communications, and may further allow users to signal agreement to, or rejection of, specific proposals. If transaction details that are proposed via supplementary elements of the communication protocol are rejected, users may propose different prices/lots via supplementary elements. For example, user Ay428 may then transmit a new communication C6 that proposes a different price for the financial instrument:

C6: #Ay428_CrudeOil_500_10_sell.

C6 indicates that user Ay428 is interested in selling 500 units (or lots, or shares) at a price of 10 of the financial instrument CrudeOil.

In some embodiments, the communication protocol allows a user to specify a counterparty by listing a counterparty's user identifier 420 in the supplementary protocol elements of the communication protocol.

Accordingly, the process 500 illustrates an example of the use of the communication protocol and integration application that allows two users using incompatible communication clients (e.g., communication clients/chat applications on two different communication platforms) to discover other parties interested in trading a common financial instrument (conveyed through the primary elements of communication protocol 400), negotiate on the terms of the transaction (conveyed through the supplementary elements of communication protocol 400), and agree to or come to a commitment (conveyed through a resolution element of communication protocol 400) despite using disparate, incompatible communication platforms. Without the integration clients and the integration application, communications entered into the communication client 306 of communication platform 302 would not be conveyed to communication client 310 of communication client 304.

It should be appreciated that the use of the communication protocol over the integration application requires the users to register with the exchange computing system ahead of time, and to understand the syntax, meaning and proper use of the disclosed communication protocol.

As noted above, each user registered with the integration application may be associated with a user profile that specifies settings and preferences associated with that user. For example, a user may wish to receive all communications related to financial instruments that the user has expressed an interest in (e.g., by sending a communication listing the financial instrument in the primary protocol elements) during the business day. Or, the user may wish to receive all communications related to financial instruments that the user has expressed an interest in (e.g., by sending a communication listing the financial instrument in the primary protocol elements) during the past hour. Moreover, a user may specify an amount of time that his or her communication remains alive in the database 322. For example, a user may specify that a communication should only be discoverable or retrievable for 2 hours after the communication has been added to the database 322. If a second user accepts a first user's proposal for a trade after a specified time threshold (specified by the first user) has expired, the integration application does not validate the second user's acceptance.

In one embodiment, the integration application allows a user to specify, via user profile settings, both what they want to see from others, and what, of their communications, they want others to see. The system reconciles the cross-permissions of all users when relaying communications. This could be based on financial instrument, user, etc., e.g., a user A can specify that he/she only wants user B and C (who may be using communication clients on different communication platforms than user A) to see user A's offers related to oil and gas, whereas users C, D, and E can see user A's offers related to gold. User A can also specify that user A only wants to see communications from users C and E, or only those communications related to gold.

The disclosed embodiments also contemplate enabling users to specify credit based filtering, where the integration application filters communications sent to a user based on the credit rating of each user and counter-party credit preferences of a user. For example, a user A may be able to further specify that his/her communications are only available/transmitted to users with a credit rating of A or higher. User A can also specify that he/she should only receive communications from users with a credit rating of B or higher (or lower), etc.

FIG. 6 illustrates an example flowchart of an example computer implemented method 600. Embodiments may involve all, more or fewer actions than the illustrated actions. The actions may be performed in the order or sequence shown, or in a different sequence. The actions may be performed simultaneously, or in a parallel or overlapping fashion. The method may be performed by processing logic that may comprise hardware (circuitry, dedicated logic, etc.), software, or a combination of both. In one example, the method is performed by the computer system 100 of FIG. 1, while in some other examples, some or all of the method may be performed by another machine.

At step 602, method 600 includes monitoring, by a processor, communications over a plurality of communication platforms. For example, an integration application, in conjunction with a plurality of integration clients installed on communication clients across multiple communication platforms, many monitor the communications being entered into the communication clients.

At step 604, method 600 includes detecting, by the processor, that a first communication entered into a first communication client of a first communication platform corresponds to a communication protocol, the first communication including a protocol identifier and a plurality of primary protocol elements including a first user identifier and an instrument identifier. At step 606, method 600 includes storing, by the processor, in a database, the first communication.

At step 608, method 600 includes detecting, by the processor, that a second communication entered into a second communication client of a second communication platform corresponds to the communication protocol, the second communication including the protocol identifier and a plurality of primary protocol elements including a second user identifier and the instrument identifier. At step 610, method 600 includes storing, by the processor, in the database, the second communication.

At step 612, method 600 includes retrieving, by the processor, from the database, previously detected communications entered into any of the communication clients associated with any of the communication platforms and including the instrument identifier associated with the second communication, including retrieving the first communication. For example, the integration application may be configured to retrieve other previously received/detected communications related to the financial instrument that is identified in the first communication.

At step 614, method 600 includes transmitting, by the processor, the retrieved first communication to the second communication client.

In one embodiment, method 600 may further include detecting, by the processor, that a third communication entered into the second communication client corresponds to the communication protocol, the third communication including the second communication and at least one supplementary protocol element; storing, by the processor, in the database, the third communication; and transmitting, by the processor, the third communication to the first communication client. The supplementary protocol element may include one of a quantity, a price, and a directionality for a proposed trade.

In one embodiment, method 600 may further include detecting, by the processor, that a fourth communication entered into the first communication client corresponds to the communication protocol, the fourth communication including the third communication, and a first resolution protocol element; storing, by the processor, in the database, the fourth communication; and transmitting, by the processor, the fourth communication to the second communication client.

In one embodiment, method 600 may further include detecting, by the processor, that a fifth communication entered into the second communication client corresponds to the communication protocol, the fifth communication including the fourth communication, and a second resolution protocol element; generating, by the processor, a sixth communication; and transmitting, by the processor, the sixth communication to the first and second communication clients. The sixth communication may be a trade execution confirmation indicating to the users of the first and second communication clients that their proposed trade, i.e., their bilateral transaction, has been matched and executed.

In one embodiment, method 600 may further include generating, by the processor, an executed trade; and transmitting the executed trade to a clearinghouse computing system.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the described embodiments should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is therefore intended that the foregoing detailed description be regarded as illustrative rather than limiting, and that it be understood that it is the following claims, including all equivalents, that are intended to define the spirit and scope of this invention.

The invention claimed is:

1. A computer implemented method comprising:
    monitoring, by a processor, communications via a first communication platform configured to transmit communications only between communication clients associated therewith and via a second communications platform configured to transmit communications only between communications clients associated therewith;
    storing, by the processor, in a database coupled therewith, a copy of a first unsolicited communication communicated by a first sender via the first communication platform based on detection, by the processor, of a protocol identifier within the first unsolicited communication indicative of the first unsolicited communication corresponding to a communication protocol, the first unsolicited communication including a first user identifier and a first instrument identifier;
    storing, by the processor, in the database, a copy of a second unsolicited communication communicated by a second sender via the second communication platform based on detection, by the processor, of the protocol identifier within the second unsolicited communication indicative of the second unsolicited communication corresponding to the communication protocol, the second unsolicited communication including a second user identifier and a second instrument identifier identical to the first instrument identifier;
    transmitting, by the processor via the second communications platform to the second sender from the database based on the second unsolicited communication, any previously stored communications which includes an instrument identifier identical to the second instrument identifier;
    storing, by the processor, in the database, a copy of a third communication communicated via the second communication platform determined by the processor to correspond to the communication protocol and to be responsive to the first unsolicited communication; and
    transmitting, by the processor via the first communication platform, the third communication to the first sender.

2. The computer implemented method of claim 1, wherein the third communication further includes one of a quantity, a price, and a directionality for a proposed trade.

3. The computer implemented method of claim 1, wherein the first and second unsolicited communications comprise data indicative of interest in a transaction related to an instrument identified by the first and second instrument identifiers, and the third communication comprises data indicative of a request for the transaction, the method further comprising:
    storing, by the processor, in the database, a copy of a fourth communication communicated by the first sender determined by the processor to correspond to the communication protocol and to be responsive to the third communication and comprises data indicative of an acceptance of the transaction; and
    transmitting, by the processor via the second communication platform, the fourth communication to the second sender.

4. The computer implemented method of claim 3, further comprising:
    generating, by the processor, an executed trade; and
    transmitting the executed trade to a clearinghouse computing system.

5. The computer implemented method of claim 1, wherein the transmitting of the previously stored communications further comprises retrieving, by the processor from the database based on the second unsolicited communication and further based on first and second profiles, any previously stored communications communicated via a communications platform monitored by the processor which includes an instrument identifier identical to the second instrument identifier and which satisfied both the first and second profiles, the first profile specifying, for the first sender, which communications received from the first sender may be provided to other senders, and the second profile specifying, for the second sender, which communications received from other senders are to be provided to the second sender.

6. The computer implemented method of claim 5, wherein the first and second profiles each further specify credit criteria, the first profile specifying, for the first sender, that communications received from the first sender may be provided to only to other senders which satisfy the specified credit criteria of the first profile, and the second profile specifying, for the second sender, that only communications received from other senders which satisfy the specified credit criteria of the second profile are to be provided to the second sender.

7. The computer implemented method of claim 1, wherein the processor implements a graphic user interface for receiving communications from the first and second senders.

8. A computer system comprising:
    a chat monitor configured to monitor communications via a first communication platform configured to transmit communications only between communication clients associated therewith and via a second communications platform configured to transmit communications only between communications clients associated therewith;
    a parser coupled to the chat monitor and configured to:
        store in a database coupled with the parser a copy of a first unsolicited communication communicated by a first sender via the first communication platform based on detection of a protocol identifier within the first unsolicited communication indicative of the first unsolicited communication corresponding to a communication protocol, the first unsolicited communication including a first user identifier and a first instrument identifier;

store in the database a copy of a second unsolicited communication communicated by a second sender via the second communication platform based on detection of the protocol identifier within the second unsolicited communication indicative of the second unsolicited communication corresponding to the communication protocol, the second unsolicited communication including a second user identifier and a second instrument identifier identical to the first instrument identifier;

transmit, via the second communications platform to the second sender from the database based on the second unsolicited communication, any previously stored communications which includes an instrument identifier identical to the second instrument identifier;

store in the database a copy of a third communication communicated via the second communication platform determined to correspond to the communication protocol and to be responsive to the first unsolicited communication; and transmit, via the first communication platform, the third communication to the first sender.

9. The computer system of claim 8, wherein the first and second unsolicited communications comprise data indicative of interest in a transaction related to an instrument identified by the first and second instrument identifiers, and the third communication comprises data indicative of a request for the transaction, the parser being further configured to:

store in the database a copy of a fourth communication communicated by the first sender determined to correspond to the communication protocol and to be responsive to the third communication and comprises data indicative of an acceptance of the transaction; and transmit, via the second communication platform, the fourth communication to the second sender.

10. The computer system of claim 8, wherein the parser is further configured to retrieve from the database, based on the second unsolicited communication and further based on first and second profiles, , any previously stored communications communicated via a communications platform monitored by the computer system which includes an instrument identifier identical to the second instrument identifier and which satisfied both the first and second profiles, the first profile specifying, for the first sender, which communications received from the first sender may be provided to other senders, and the second profile specifying, for the second sender, which communications received from other senders are to be provided to the second sender.

11. The computer system of claim 10, wherein the first and second profiles each further specify credit criteria, the first profile specifying, for the first sender, that communications received from the first sender may be provided to only to other senders which satisfy the specified credit criteria of the first profile, and the second profile specifying, for the second sender, that only communications received from other senders which satisfy the specified credit criteria of the second profile are to be provided to the second sender.

12. The computer system of claim 8, wherein the chat monitor comprises a graphic user interface for receiving communications from the first and second senders.

13. A computer system comprising:
a processor; and
a memory communicatively coupled to the processor, the memory comprising software that, when executed by the processor, performs operations that cause the processor to:

monitor communications via a first communication platform configured to transmit communications only between communication clients associated therewith and via a second communications platform configured to transmit communications only between communications clients associated therewith;

store in a database coupled with the processor a copy of a first unsolicited communication communicated by a first sender via the first communication platform based on detection of a protocol identifier within the first unsolicited communication indicative of the first unsolicited communication corresponding to a communication protocol, the first unsolicited communication including a first user identifier and a first instrument identifier;

store in the database a copy of a second unsolicited communication communicated by a second sender via the second communication platform based on detection of the protocol identifier within the second unsolicited communication indicative of the second unsolicited communication corresponding to the communication protocol, the second unsolicited communication including a second user identifier and a second instrument identifier identical to the first instrument identifier;

transmit, via the second communications platform to the second sender from the database based on the second unsolicited communication, any previously stored communications which includes an instrument identifier identical to the second instrument identifier;

store in the database a copy of a third communication communicated via the second communication platform determined to correspond to the communication protocol and to be responsive to the first unsolicited communication; and transmit, via the first communication platform, the third communication to the first sender.

14. The computer system of claim 13, wherein the third communication further includes supplementary protocol elements including one of a quantity, a price, and a directionality for a proposed trade.

15. The computer system of claim 13, wherein the first and second unsolicited communications comprise data indicative of interest in a transaction related to an instrument identified by the first and second instrument identifiers, and the third communication comprises data indicative of a request for the transaction, the software that, when executed by the processor, performs further operations that cause the processor to:

store in the database a copy of a fourth communication communicated by the first sender determined to correspond to the communication protocol and to be responsive to the third communication and comprises data indicative of an acceptance of the transaction; and transmit, via the second communication platform, the fourth communication to the second sender.

16. The computer system of claim 15, wherein the software that, when executed by the processor, performs further operations that cause the processor to:
  generate an executed trade; and
  transmit the executed trade to a clearinghouse computing system.

17. The computer system of claim 13, wherein the transmission of the previously stored communications further comprises retrieval from the database based on the second unsolicited communication and further based on first and second profiles, any previously stored communications communicated via a communications platform monitored by the computer system which includes an instrument identifier identical to the second instrument identifier and which satisfied both the first and second profiles, the first profile specifying, for the first sender, which communications received from the first sender may be provided to other senders, and the second profile specifying, for the second sender, which communications received from other senders are to be provided to the second sender.

18. The computer system of claim 17, wherein the first and second profiles each further specify credit criteria, the first profile specifying, for the first sender, that communications received from the first sender may be provided to only to other senders which satisfy the specified credit criteria of the first profile, and the second profile specifying, for the second sender, that only communications received from other senders which satisfy the specified credit criteria of the second profile are to be provided to the second sender.

19. The computer system of claim 13, wherein the processor implements a graphic user interface for receiving communications from the first and second senders.

20. A computer system comprising:
  means for monitoring communications via a first communication platform configured to transmit communications only between communication clients associated therewith and via a second communications platform configured to transmit communications only between communications clients associated therewith;
  means for storing in a database a copy of a first unsolicited communication communicated by a first sender via the first communication platform based on detection of a protocol identifier within the first unsolicited communication indicative of the first unsolicited communication corresponding to a communication protocol, the first unsolicited communication including a first user identifier and a first instrument identifier;
  means for storing in the database a copy of a second unsolicited communication communicated by a second sender via the second communication platform based on detection of the protocol identifier within the second unsolicited communication indicative of the second unsolicited communication corresponding to the communication protocol, the second unsolicited communication including a second user identifier and a second instrument identifier identical to the first instrument identifier;
  means for transmitting, via the second communications platform to the second sender from the database based on the second unsolicited communication, any previously stored communications which includes an instrument identifier identical to the second instrument identifier;
  means for storing in the database, a copy of a third communication communicated via the second communication platform determined to correspond to the communication protocol and to be responsive to the first unsolicited communication; and
  means for transmitting, via the first communication platform, the third communication to the first sender.

* * * * *